United States Patent [19]

Schoen

[11] Patent Number: 4,466,101
[45] Date of Patent: Aug. 14, 1984

[54] RELATIVISTIC ELECTRON SYNCHROTRON LASER OSCILLATOR OR AMPLIFIER

[76] Inventor: Neil C. Schoen, 13 Golden Star, Irvine, Calif. 92714

[21] Appl. No.: 288,011

[22] Filed: Jul. 29, 1981

[51] Int. Cl.³ .............................................. H01S 3/00
[52] U.S. Cl. ......................................... 372/2; 372/73
[58] Field of Search .................. 372/2, 70, 73, 37; 330/4.31

[56] References Cited

PUBLICATIONS

Buzzi et al., "New High Power Microwave Sources in the Millimetric Range", Sep. 4–8, 1978.
"Coherent Radiation from an Intense Relativistic Electron Beam Rotating in a Background Plasma", Granatstein et al., App. Phys. Lett. 32(2), Jan. 15, 1978.

Primary Examiner—William L. Sikes
Assistant Examiner—Leon Scott, Jr.

[57] ABSTRACT

A technique for constructing electromagnetic oscillators and amplifiers producing coherent radiation tunable from the microwave through the x-ray spectral regions. The resulting class of devices posses such novel and desirable features as broad band or narrow band operational capability in a high power and high efficiency mode. A relativistic electron beam is injected into an axial solenoidal magnetic field with a component of perpendicular motion and subsequently rotates and emits synchrotron radiation. Radiation of the proper frequency and direction will pass over the rotating beam electrons in such fashion as to cause them to lose energy to the radiation field and thus cause the intensity of the radiation field to increase. Selection of the proper radiation cavity results in laser oscillator or amplifier behavior with novel attributes.

14 Claims, 8 Drawing Figures

A

B

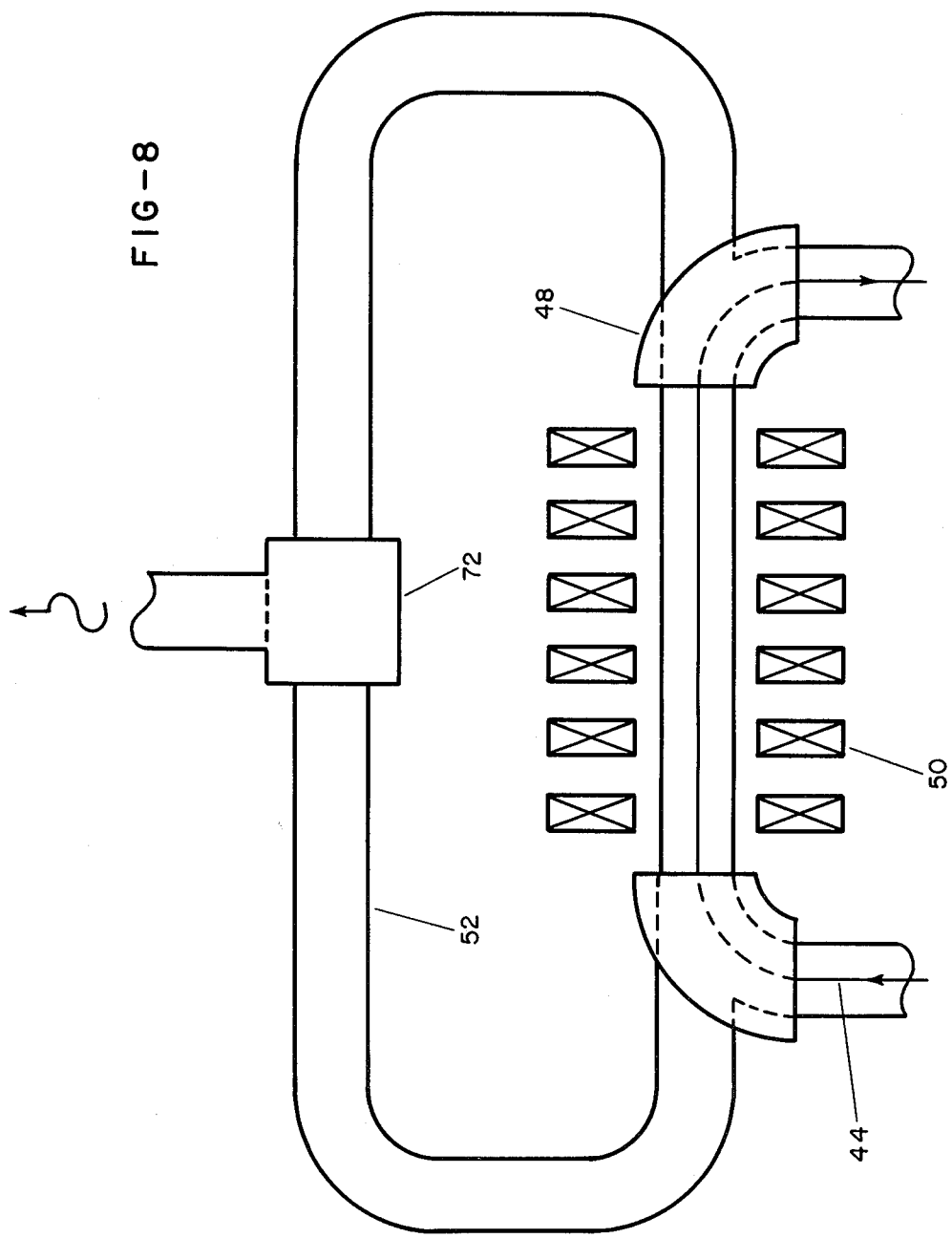

RELATIVISTIC ELECTRON SYNCHROTRON LASER OSCILLATOR OR AMPLIFIER

INTRODUCTION

There is increasing interest in the development of high power tunable electromagnetic amplifiers and oscillators to operate in regions of the radiation spectrum heretofore inaccessible by previously existing devices. In particular, such devices operating in the high frequency microwave region (>10 GHz) would be useful for applications in high-resolution radar, communications, and fusion energy technologies.

Although there are currently devices which are at various stages of development in an attempt to reach these desirable spectral regions, all have limitations or deficiencies that emphasize or delineate the unique properties of the present invention. Among the most prominent conventional approaches to the generation or amplification of radiation in the microwave to x-ray spectral band are solid state devices and atomic or molecular lasers. Newly developing approaches include the gyrotron and the free-electron laser.

Classes of solid state devices, such as electron-tube analog circuits in the form of discrete components or integrated circuits, or solid state laser configurations, all suffer power limitations due to the extremely small size of the active elements necessary to generate or amplify high frequency radiation. In addition, tunability and output bandwidth are limited in certain of these devices.

Atomic-molecular laser devices are inherently narrow band devices, relying on atomic and molecular transitions to achieve extremely narrow frequency operational range. Although techniques are available to shift or broaden the output frequency of these lasers, such shifting is usually discrete and not variable, and covers a limited range.

Recently developed gyrotron devices are capable of generating or amplifying high power microwave radiation, but lack several desirable features. For example, operation at frequencies in excess of 100 GHz require very high field superconducting magnets and effectively limit the upper frequency range of the device. Operation at higher harmonics at high power creates mode control problems. The output radiation of gyrotrons is limited to bandwidths in the 10%–20% range and the devices are not easily tunable.

Free-electron laser (FEL) devices utilizing spatially varying magnetic "pump" fields are presently in initial stages of development. The present invention has significant configurational and operational differences and advantages that distinguish it from conventional FEL devices. In terms of physical configuration, the present devices employ a solenoidal magnetic field, as opposed to a spatially varying or "undulating" field. This presents new and unique operational capabilities and consequences not previously explored or predicted, as will be further explained. Specifically, this allows broad band operation and a multiplicity of tuning or modulation operations not previously available in the devices briefly described as prior art.

SUMMARY OF THE INVENTION

The implementation of the present invention is accomplished as follows. An electron beam is made to enter a solenoidal magnetic field region in such fashion as to control the axial component (parallel to the solenoidal magnetic field) of the electron beam velocity. This produces helical motion by the beam electrons such that the perpendicular velocity component of each electron rotates about the solenoidal magnetic field direction with a rotation period determined by the cyclotron frequency of the electrons in the solenoidal field. Electromagnetic radiation of the proper frequency and polarization will have an electric field vector rotating in near synchronism with the perpendicular velocity vectors of the beam electrons, thereby causing the beam electrons to lose energy and thereby increase the intensity of the radiation. The initial radiation can be injected, as in an amplifier, or be spontaneously emitted by the beam, as in an oscillator or laser. Even though the electrons radiate energy in a broad spectrum (synchrotron radiation), only radiation of the proper frequencies and directions will be amplified. In addition, the amplified radiation causes the electrons to spatially bunch, leading to coherent radiation only at the proper frequencies and thus selective amplification.

For the purposes of further explanation of the present invention and presentation of the novel features of said invention to distinguish it from prior art, consider the following. A Lorentz transformation to a frame of reference moving with the axial velocity of the beam electrons would result in a situation in which the electrons appear to move in purely circular fashion. This circular motion will result in emission of synchrotron radiation directed both in the plane of circular motion (transverse) and perpendicular to that plane.

Gyrotron devices utilize radiation directed in the plane of circular motion in the reference frame described above. In particular, they are designed to function with the Doppler shifted radiation emitted in the direction opposite to the axial motion of the electrons, i.e. the backward-going Doppler shifted transverse radiation. In the laboratory frame, this radiation always appears at the cyclotron frequency. Thus gyrotrons, as they now exist, are not relativistic devices (since the output frequency goes down with increasing electron energy) and are tunable only by varying the magnetic field strength. In addition, the gyrotron does not employ a laser-type cavity resonator with end reflectors, as does the oscillator/laser configuration of the present invention.

The Doppler shifted transverse radiation emitted in the forward or beam direction has yet to be utilized in any existing devices. This radiation is frequency upshifted from the cyclotron frequency but has the same fractional bandwidth. Thus this feature of the present invention allows for tunability of narrow band radiation with frequency limited only by the limits to the energy of the electron beam. Both Doppler shifted frequencies (forward and backward) derived from the transverse emitted radiation depend on azimuthal electron beam bunching for amplification to occur.

Consider now the radiation emitted perpendicular to the plane of circular motion of the beam electrons in the moving reference frame. Radiation emitted in the general direction of the electron beam will be Doppler shifted upward (by a different amount than the transverse radiation). This radiation will lead, through the ponderomotive force of the radiation fields, to longitudinal or axial bunching of the electron beam and subsequent amplification of selected frequencies. The present invention utilizes this particular radiation (forward-directed Doppler upshifted) to achieve tunable broad band amplification. A key feature of this device which distinguishes it from free-electron devices under development is the solenoidal magnetic field.

Conventional FEL's employ spatially varying magnetic fields such as alternating polarity dipoles or bifilar helical configurations to define a spatial period for the electron beam motion. Thus the operating frequency of FEL's is defined by the spatial period and magnitude of the "pump" or "wiggler" magnetic field and the electron beam energy. Tuning can effectively be accomplished only by changing the electron beam energy. The well defined spatial frequency leads to relatively narrow band frequency behavior. In addition, high efficiency operation of FEL devices requires that the maximum number of beam electrons be "trapped" by the ponderomotive potential of the radiation field. This places constraints on the energy spread and angular divergence of the electron beam. The off-axis variation of the "wiggler" magnetic field also places constraints on the size of the electron beam as it enters the "wiggler" region.

In contrast, the present invention has no fixed spatial periodicity, since the rotation frequency of the beam electrons is determined solely by the electron energy, and the spatial period for rotation is the result of the initial partition or selection of the beam perpendicular and axial velocity components. Thus the frequency selected for amplification can be varied by changing the initial perpendicular velocity component of the beam or the total beam energy, allowing for more versatility in tuning.

Since the solenoidal field can be made uniform over large cross-sectional areas, the phase space constraints on the electron beam are less severe, since beam size can be relaxed to achieve lower angular divergence, or larger energy spreads can be allowed provided that the angular divergence can be properly manipulated to reduce the energy spread effects.

The solenoidal magnetic field allows larger energy excursions for beam electrons than the spatially varying FEL magnetic configuration for comparable initial conditions. This condition persists for large excursions from the resonant frequency and allows for larger bandwidths in the present invention. Indeed, off-resonance operation is required for net electron energy loss and subsequent amplifier/oscillator behavior.

Further advantages of this invention are the potential for high current operation, since the solenoidal fields utilized are well suited to confining beams that would tend to "blow up" or expand due to space charge forces. When the electron beam and solenoidal field are combined with appropriate wave guide structures and suitable end reflector designs (including frequency selective reflectors), a microwave "laser" capable of multi-megawatt operation can be constructed as an embodiment of this invention.

DESCRIPTION OF THE DRAWINGS

FIG. 8 is a schematic diagram illustrating one of the possible alternate configurations to achieve desirable frequency modifications.

DESCRIPTION OF PREFERRED EMBODIMENTS

Maximum advantage can be obtained from the novel features of the present invention when a device, built in accordance with the principles described in this document, is configured to operate in the microwave region. This should not be construed as to limit the scope of this invention in any way or fashion to a particular spectral region, nor should the particular configuration to be described limit the potential embodiments of said invention.

Figure 1:
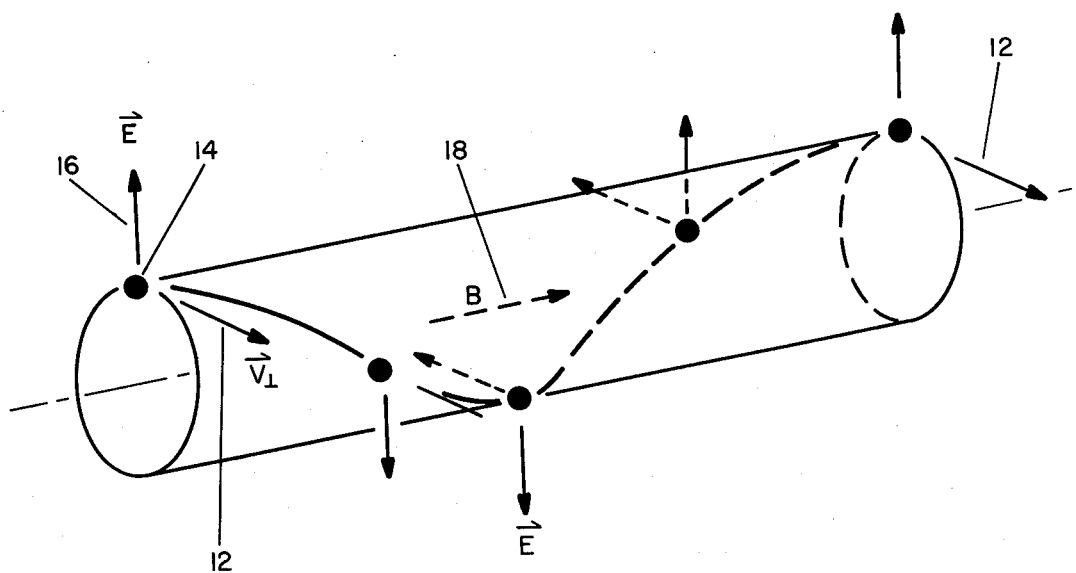
FIG. 1 is a schematic diagram illustrating the synchronism of the radiation electric vector rotation with the rotation of the perpendicular velocity vector of the electron moving in the solenoidal magnetic field.
Figure 2:
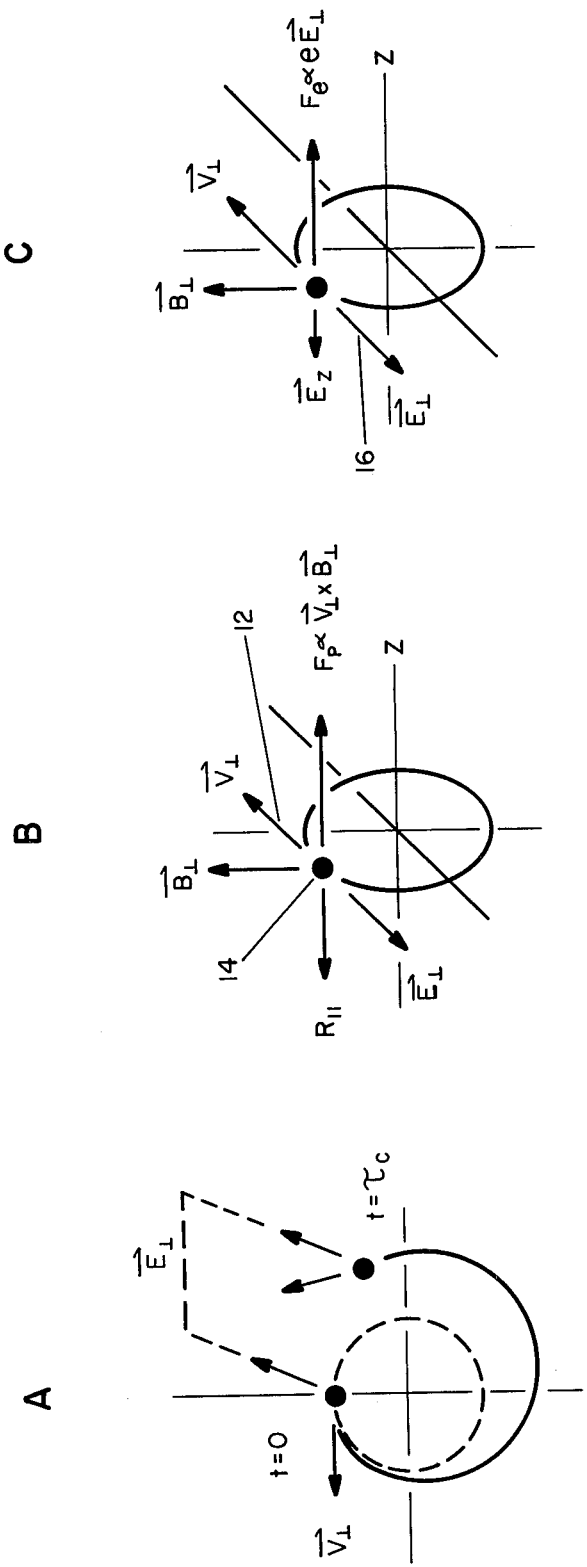
FIG. 2 is a schematic diagram illustrating three mechanisms responsible for electron beam bunching (azimuthal and axial)

The unique and special properties germane to this invention can best be distinguished by referring to FIG. 1-2. Synchronism of the rotating perpendicular velocity vector 12 of the electron 14 with the electric field vector 16 of the radiation field shown in FIG. 1 illustrates how the radiation field can act on the electron through a v·E mechanism over many rotation periods in the solenoidal magnetic field 18 and thus cause it to lose significant energy to the radiation field. The condition for exact synchronism for relativistic electrons is $$\omega = (1+\beta_z)\gamma_z^2 \Omega_c$$

Where $\omega$ is the proper radiation frequency, $\beta_z$ is the axial electron velocity ($=v_z/c$), $\gamma_z$ is $(1-\beta_z^2)^{-1}$, and $\Omega_c$ is the relativistic cyclotron frequency ($eB/mc\gamma$). The above equation indicates several of the novel features of this invention. First note that the output frequency $\omega$ is tunable by changing the electron beam energy (i.e. $\gamma mc^2$) and therefore also ($\gamma_z$), or by changing the axial velocity only (i.e. $\beta_z$ and thus $\gamma_z$) while keeping the total energy fixed.

With regard to existing devices, gyrotrons operate at very mildly relativistic energies ($\gamma < 1.1$) near waveguide cut-off frequencies and are designed for operation only near the non-relativistic cyclotron frequency ($\Omega_c{}^{nr}=eB/mc$) or harmonics thereof, as opposed to the tunability and potential for much higher frequency output of the present invention. Present FEL devices have fixed spatial periods determined by the "wiggler" period, and thus it is not possible to partition the axial and perpendicular components of the electron velocity in an arbitrary fashion, since the perpendicular velocity component is determined by the magnitude of the perpendicular magnetic field of the "wiggler". This leads to stringent requirements on the electron beam emittance and narrow band frequency response. In the present device, the initial electron beam conditions determine the spatial period of the rotating electrons, allowing variability in frequency response and reduced emittance restrictions, since $\beta_z$ and $\beta_\perp$ of the electron beam can be varied by beam conditioning magnets at the expense of an increase in electron beam size. Since the solenoidal field can easily be made uniform over large cross sectional regions, this beam conditioning causes no loss of resonance as would be the case for off-axis electrons in a periodic FEL "wiggler". In effect, the constraints on the six-dimensional phase space of the electron beam have been relaxed by the uniformity and lack of periodicity of the solenoidal magnetic field.

Another characteristic of the present invention is the electron bunching property, as illustrated in FIG. 2A-C. The electric field vector of the radiation and the energy dependence of the relativistic cyclotron frequency $\Omega_c$ lead to azimuthal bunching as illustrated in FIG. 2A. There are two possible mechanisms for axial bunching; the ponderomotive force shown in FIG. 2B, and the electrostatic force shown in FIG. 2C. Both axial bunching mechanisms can be operative in a waveguide mode, leading to the generation of coherent radiation in the axial direction. Only the azimuthal bunching is necessary for gyrotron operation and axial bunching is essentially absent since $e|v_\perp B_\perp| << e|E_\perp|$ for low energy electrons. Conventional FEL devices create axial bunching but disrupt azimuthal bunching due to the action of the "wiggler" transverse magnetic field. Only the present invention allows both azimuthal and axial bunching to occur allowing for greater versatility in selecting the output characteristics desired from the device.

Figure 3:
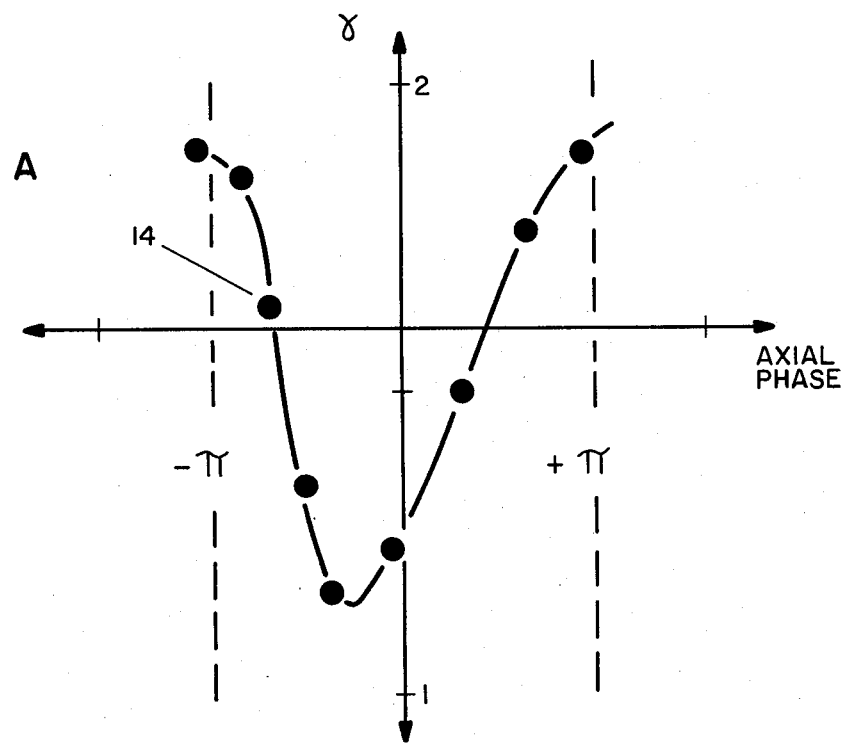
FIG. 3 is a graph showing the variation in energy of electrons of different axial or longitudinal phase for two different initial beam energy values.
Figure 3:
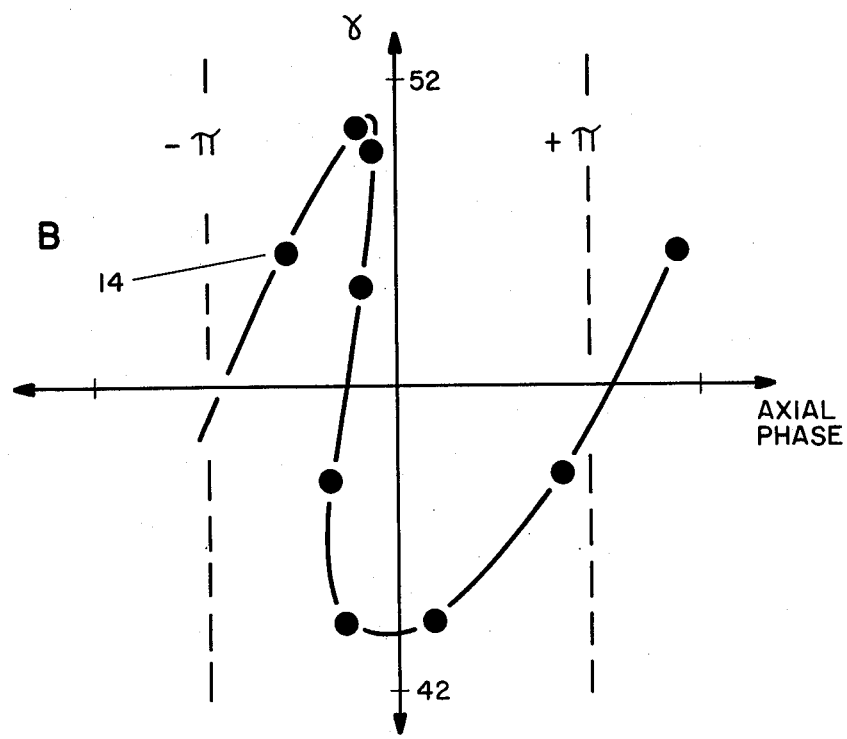

To achieve coherent radiation amplification requires that there be a net loss of energy averaged over all electrons, regardless of their phase relative to the electric field. For this to occur the radiation frequency must be a few percent off exact resonance. This feature is demonstrated in FIG. 3A-B by computer generated energy-axial phase plots for two different initial electron beam energy values. These curves were generated for TEM waves which only have fields transverse to the direction of propagation. Electrons 14 start out initially with equal spacing along the phase axis, but tend to bunch about a negative phase value. The presence of unequal areas above and below the phase axis indicate a net energy loss leading to amplification of the radiation field. Azimuthal bunching tends to disappear as $\gamma$ becomes large (not shown here) so that the gyrotron interaction becomes inoperative as $\gamma$ increases substantially.

Figure 4:
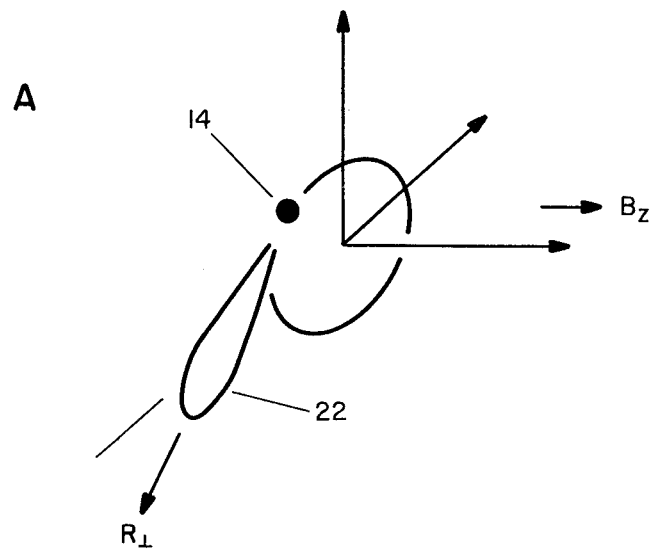
FIG. 4 is a schematic diagram illustrating the transverse and perpendicular radiation patterns in the reference frame moving with the axial velocity of the beam electrons.
Figure 4:
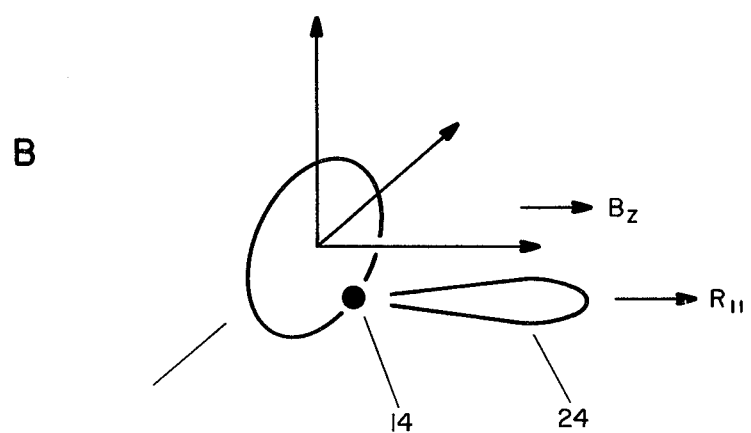

Further delineation from prior art is explained with reference to FIG. 4A-B which defines the two directional features of the radiation emitted by the electrons in the beam as seen in a frame of reference moving with the axial velocity of the electrons. Transverse radiation in the plane of electron circular motion 22 shown in FIG. 4A is responsible for gyrotron operation. In particular, the Doppler shifted backward wave is responsible for the gyrotron fundamental at $\Omega_c$. The present invention will also operate on the Doppler shifted forward wave which will appear at $\omega \sim \gamma_z^2 \Omega_c$ with band width comparable to the peak at $\Omega_c$. Such behavior, not previously demonstrated by gyrotron devices, is a unique feature of the present invention. The Doppler shifted radiation perpendicular to the plane of circular motion 24 in the direction of the electron beam axial velocity is pictured in FIG. 4B. This radiation is responsible for the broad band output in conjunction with the electron beam initial conditions and the solenoidal magnetic field.

Figure 5:
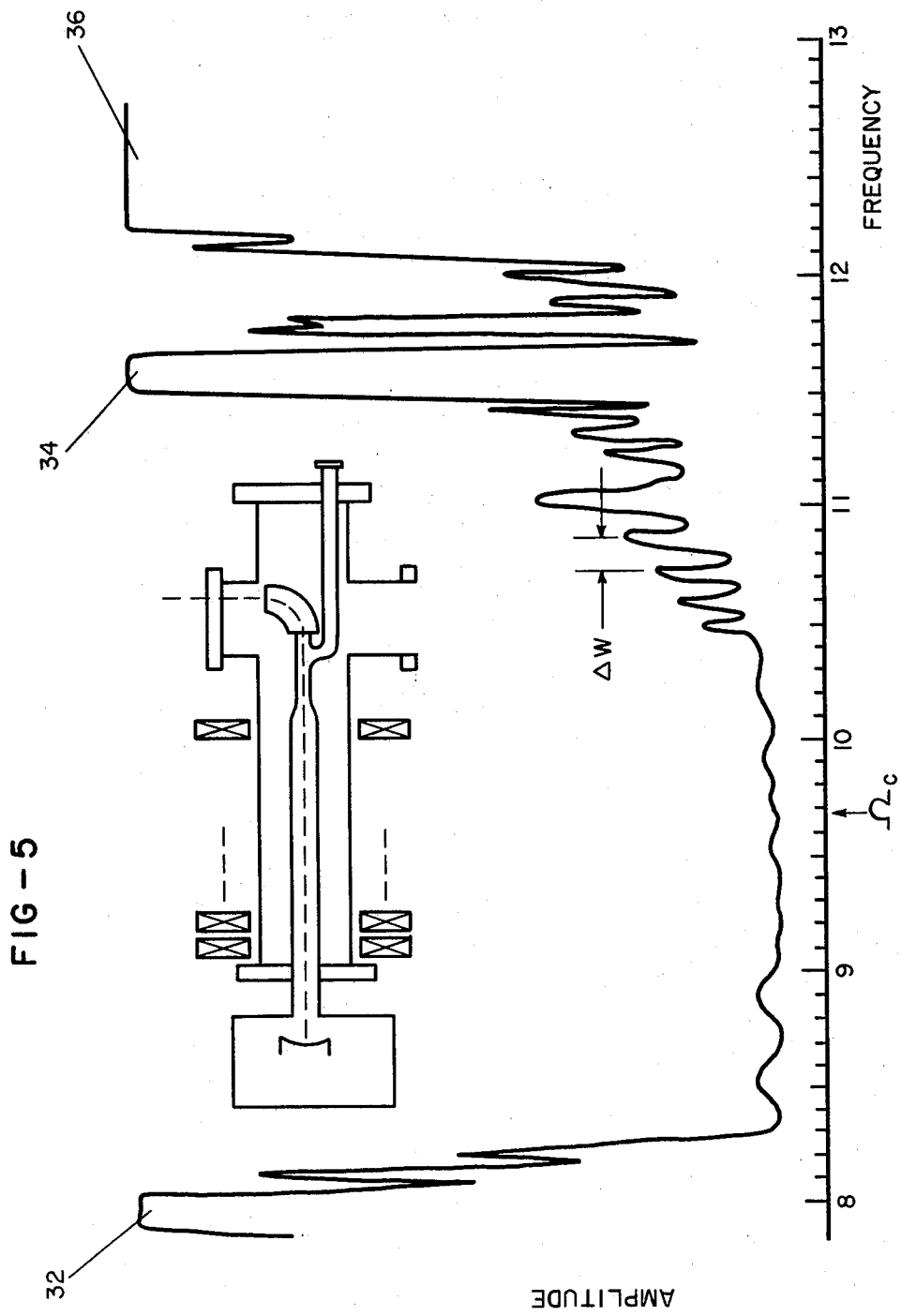
FIG. 5 is a reproduction of data of a frequency scan recorded from a prototype device (shown as an inset) constructed in accordance with the present invention.

An experiment was conducted on a prototype device to demonstrate the concepts described in this document and the data acquired is reproduced in FIG. 5 in the form of an output frequency scan. A schematic diagram of the prototype device is also shown in FIG. 5 as an inset. The cavity end reflectors needed for laser/ocsillator operation were provided in effect by the waveguide impedance mismatches at each end of the central circular waveguide structure. The electron beam in this configuration was directly injected coaxial to the solenoidal magnetic field and the output radiation was coupled to a rectangular waveguide prior to entering a heterodyne-type frequency measuring apparatus.

The essential features described in previous paragraphs can clearly be seen in the frequency scan data. The lowest frequency peak 32 represents the backward wave Doppler shifted cyclotron radiation commonly utilized in gyrotron devices. The second relatively narrow peak 34 at $\gamma_z^2 \Omega_c$ represents the forward wave Doppler upshifted cyclotron radiation which has not been exploited in prior art and thus represents one of the novel features of the present invention. In effect one now has the capability to vary this narrow band signal without changing the magnetic field, which should allow the attainment of 100 GHz operation at high power with modest electron beam energies (1 Mev) and conventional magnet design (i.e. not superconducting).

The relatively broad band radiation 36 at the upper end of the frequency scan represents the maximally Doppler shifted radiation emitted in the axial direction as shown previously in FIG. 4B. This radiation results from the axial bunching of the electron beam and its broad band nature is a result of the uniform nature of the solenoidal magnetic field and the multi-mode properties of the waveguide. The broadband radiation capability is another feature novel to this device. The frequency separation $\Delta \omega$ of the small oscillations shown in FIG. 5 is characteristic of the length of the circular waveguide section or "cavity" and is further evidence of laser-like operation.

The information contained in FIG. 5 in addition to the complementary description of the present invention contained herein represents evidence for the operation of a real device, and thus a reduction to practice has been previously demonstrated.

Figure 6:
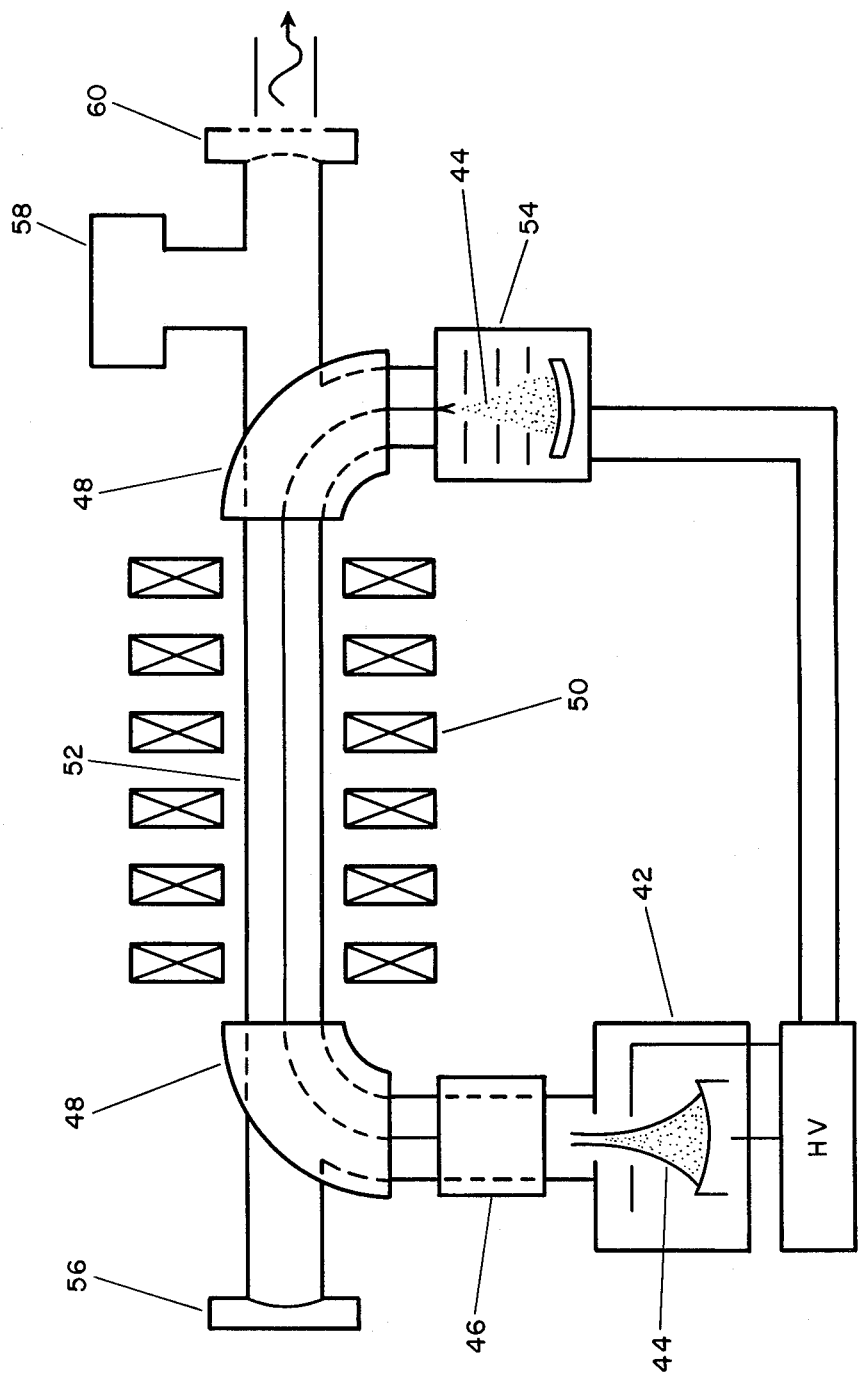
FIG. 6 is a schematic diagram of a microwave laser constructed in accordance with the present invention.

A schematic diagram of a device constructed in accordance with the principles of the present invention is presented in FIG. 6. An electron beam device 42 injects electrons 44 into a beam conditioning unit 46. The electron beam can be generated by an electron gun/high voltage supply system or a more complicated electron acceleration for higher energy beams (>1 Mev). The beam conditioning system can consist of magnetic quadrupoles and/or dipoles which are capable of altering the shape of the electron beam phase space volume so as to achieve the proper initial conditions for injecting into the solenoidal field to maximize the output power or frequency response. For example, it may be useful to minimize the spread in the axial velocity of the beam electrons by rotating the phase space ellipse to minimize the beam divergence.

After exiting from the beam conditioning unit (if necessary), the electrons enter a dipole bending magnet 48 and thence into the solenoidal field interaction region. In certain cases it may be advantageous to have the beam conditioning apparatus after the bending magnet to eliminate dispersion effects introduced by the bending magnet.

The solenoidal magnetic field 50 and waveguide 52 constitute the interaction region of the device. Upon exit from this region, the beam is bent by another dipole magnet into an energy recovering device 54 such as a depressed collector system. The converted electron beam energy is then fed back to the electron accelerating device with a net reduction in wall-plug power requirements. The amplified radiation is, of course, unaffected by the bending magnets and is retained in the straight waveguide section by reflecting devices 56 appropriate for the spectral region of operation. For microwave operation a variety of circulators, tee's, tuned cavities, etc. 58 can be used to alter the frequency response of the device by affecting the nature of the reflected radiation. Radiation outcoupling is accomplished via a partially transmitting window 60.

Figure 7:
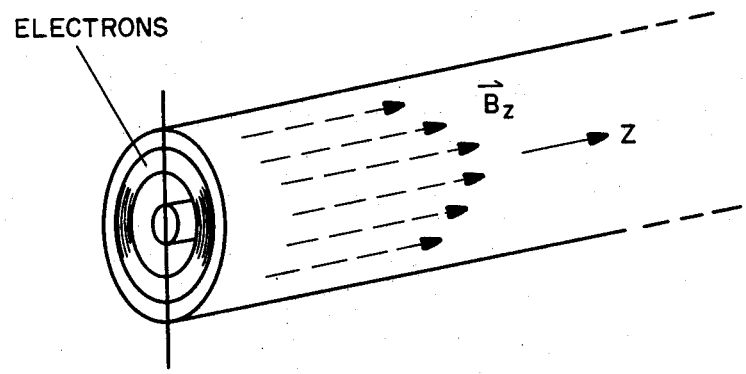
FIG. 7 is a schematic diagram illustrating possible alternate configurations which utilize TEM radiation.
Figure 7:
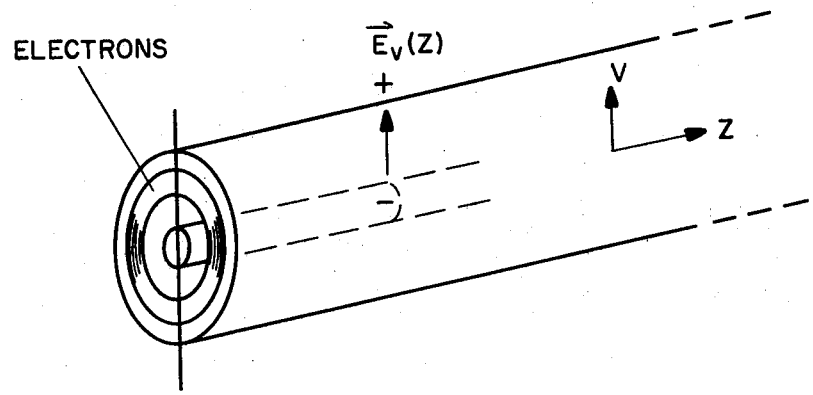

FIG. 7-8 show alternate approaches to constructing devices of the type described in this document. In principle, an electric field could be used to create the helical motion of the beam electrons and this would require a coaxial structure and a hollow ring type electron beam as shown in FIG. 7B. The coaxial geometry allows TEM modes to propagate. A configuration utilizing TEM modes with the more conventional solenoidal magnetic field is shown in FIG. 7A.

A ring resonator type configuration similar in purpose to that employed in conventional laser technology is shown in FIG. 8. This geometry allows reflections to be eliminated and a device to discriminate/select between forward and backward waves 72 to be utilized. Outcoupling might be accomplished using this special transmitting tee configuration 72.

Utilizing the principles of the present invention set forth in this document, there are many variations possible, and they are implicitly claimed as part of the full embodiment of this invention.

Specifically, what is claimed is as follows:

1. A continuously tunable electron synchrotron laser oscillator or amplifier for the generation or amplification of coherent high power radiation, from the microwave through the x-ray spectral region, comprising means for generating a uniform solenoidal magnetic field and means for generating and adjusting the directional properties of a relativistic electron beam, injecting said electron beam into said uniform solenoidal magnetic field such that the electric field vector of said radiation rotates in near synchronism with perpendicular velocity vectors of rotating electrons in said beam causing said beam electrons to lose energy by a v·E mechanism, thereby amplifying or increasing the intensity of said radiation at a desired operating frequency, said operating frequency determined by said near synchronism of said rotating electrons with the forward directed Doppler upshifted coherent synchrotron radiation emitted as a result of radiation induced bunching of said relativistic electron beam, and a radiation cavity means including radiation reflection devices to cause a portion of the coherent amplified radiation to make multiple traversals through said uniform solenoidal magnetic field region such that a coherent output is generated by passage of a portion of the coherent amplified cavity radiation through said radiation reflection devices which are partially transmissive.

2. A laser according to claim 1 including a waveguide section coaxial with said uniform solenoidal magnetic field for coupling said radiation with said relativistic electron beam.

3. An apparatus according to claim 2 wherein the uniform solenoidal magnetic field is tapered in the axial direction, i.e. changes value as a function of position along the axis, to compensate for the loss of electron beam energy and to maintain optimal coupling of said radiation to said relativistic electron beam.

4. An electron synchrotron laser according to claim 1 with coherent radiation in the microwave range including; means for generating and adjusting the directional properties of a relativistic electron beam, injecting said relativistic electron beam into a uniform solenoidal magnetic field causing the electrons in said beam to rotate such that the perpendicular velocity vectors of said electrons are in near synchronism with the rotating electric field vector of said radiation causing said beam electrons to undergo a net energy loss due to v·E forces, thereby producing a gain or amplification in the intensity of the radiation, and means for adjusting said laser to provide coherent radiation at frequencies in the 10 to 500 GHz range, said frequencies determined by the condition that the radiation amplified is the forward directed Doppler upshifted coherent synchrotron radiation with a rotating electric field vector in near synchronism with the rotating perpendicular velocity vectors of electrons in said beam, with said coherence resulting from the radiation induced bunching of said relativistic electron beam.

5. An apparatus according to claim 4 wherein the frequency of radiation is given approximately by $$\omega = (1+\beta_z)\gamma_z^2 \Omega_c;\ \Omega_c = (eB)/mc\gamma)$$

where $\beta_z$ is the electron beam axial velocity in units of the speed of light, $\gamma_z = (1-\beta_z^2)^{-\frac{1}{2}}$, and $\Omega_c$ is the relativistic electron cyclotron frequency, and said adjusting means comprises means for varying one or more of: the energy of said bunched electron beam $\gamma mc^2$, the magnetic field B, or axial component of the electron beam velocity $\beta_z$.

6. An apparatus according to claim 5 including means for injecting said electron beam into said uniform solenoidal magnetic field and means for withdrawing said beam from said field.

7. An apparatus according to claim 5 including means for recovering the energy from the electron beam after withdrawal from the magnetic field in the form of electrical energy and directing said energy to said relativistic electron beam generating device so as to reduce the wall plug power requirements of said apparatus.

8. An apparatus according to claim 5 wherein said means for generating the electron beam comprises means for generating a bunched relativistic electron beam.

9. An apparatus according to claim 5 wherein means for generating and injecting the electron beam includes a pulsed high current field emission diode coaxially aligned with said solenoidal magnetic field.

10. An apparatus according to claim 5 including a waveguide with radiation reflection devices to form a radiation cavity to cause a portion of the coherent amplified radiation to make multiple traversals through said uniform solenoidal magnetic field region such that a coherent output is generated by passage of a portion of the amplified cavity radiation through said radiation reflection devices which are partially transmissive.

11. An apparatus according to claim 5 wherein said means for adjusting the directional properties of a relativistic electron beam includes means for adjusting the phase space configuration of said relativistic electron beam so as to maximize said portion of said relativistic electron beam participating in a resonant interaction leading to maximal amplification of said radiation fields, said resonant interaction being the condition that the radiation amplified is the forward directed Doppler upshifted coherent synchrotron radiation with a rotating electric field vector in near synchronism with rotating perpendicular velocity vectors of said relativistic electrons in said beam, with said coherence resulting from the radiation induced bunching of said relativistic electron beam.

12. An apparatus according to claim 5 wherein the frequency of radiation is given approximately by $$\omega \cong \gamma_z^2 \Omega_c.$$

13. An electron synchrotron laser for generating or amplifying coherent radiation according to claim 1 wherein the uniform magnetic field is replaced by a radially symmetric electric field such as produced by an electrically charged coaxial cylindrical capacitor.

14. An apparatus according to claim 1 wherein an amplification configuration includes means for directing an external radiation beam into said relativistic electron beam.

* * * * *